(12) United States Patent
Kondo

(10) Patent No.: US 8,400,105 B2
(45) Date of Patent: Mar. 19, 2013

(54) NON-CONTACT CHARGING SYSTEM

(75) Inventor: Nobuhiro Kondo, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 41 days.

(21) Appl. No.: 13/052,874

(22) Filed: Mar. 21, 2011

(65) Prior Publication Data

US 2011/0169446 A1 Jul. 14, 2011

Related U.S. Application Data

(63) Continuation of application No. PCT/JP2009/059335, filed on May 21, 2009.

(30) Foreign Application Priority Data

Sep. 26, 2008 (JP) ................................ 2008-248335

(51) Int. Cl.
*H02J 7/00* (2006.01)
(52) U.S. Cl. ...................................... 320/108; 320/106
(58) Field of Classification Search .................. 320/106, 320/108
See application file for complete search history.

(56) References Cited

U.S. PATENT DOCUMENTS

| 6,359,417 | B1 * | 3/2002 | Winkler | 320/106 |
| 2004/0145342 | A1 * | 7/2004 | Lyon | 320/108 |
| 2008/0079392 | A1 * | 4/2008 | Baarman et al. | 320/108 |
| 2008/0297107 | A1 * | 12/2008 | Kato et al. | 320/108 |

FOREIGN PATENT DOCUMENTS

| CN | 101252294 A | 8/2008 |
| JP | 09-103037 A | 4/1997 |
| JP | 2001-266955 A | 9/2001 |
| JP | 2003-023366 A | 1/2003 |
| JP | 2005-124310 A | 5/2005 |
| JP | 2006-060909 A | 3/2006 |
| JP | 2008-005573 A | 1/2008 |
| JP | 2008-125280 A | 5/2008 |
| JP | 2008-148242 A | 6/2008 |

OTHER PUBLICATIONS

International Search Report; PCT/JP2009/059335; Aug. 11, 2009.
Written Opinion of the International Searching Authority; PCT/JP2009/059335; Aug. 11, 2009.
First Office Action issued on Nov. 5, 2012, from the State Intellectual property Office of People's Republic of China which corresponds to Chinese Patent Application No. 200980137611.8 and is related to U.S. Appl. No. 13/052,874 with translation.

* cited by examiner

*Primary Examiner* — Jermele M Hollington
*Assistant Examiner* — Son Le
(74) *Attorney, Agent, or Firm* — Studebaker & Brackett PC; Tim L. Brackett, Jr.; John F. Guay

(57) ABSTRACT

In a power transmission terminal, a charging control unit outputs an alternating current signal having a charging control voltage based on a charging control signal. A power transmission unit excites a near-electromagnetic field. A primary-side signal processing unit acquires a reception signal on the basis of a voltage at the power transmission unit at the time of load modulation communication and sets the charging control signal on the basis of reference information included in the reception signal. In a power receiving terminal, a power receiving unit is couplable to the near-electromagnetic field excited by power transmission unit. A charging voltage generating unit generates a charging voltage for a rechargeable battery. A load modulation unit changes the load impedance of the power receiving unit as viewed from the power transmission unit by performing load modulation at the time of load modulation communication. A secondary-side signal processing circuit controls the load modulation unit at the time of load modulation communication using the acquired reference information.

17 Claims, 6 Drawing Sheets

NON-CONTACT CHARGING SYSTEM

CROSS REFERENCE TO RELATED APPLICATIONS

The present application is a continuation of International Application No. PCT/JP2009/059335, filed May 21, 2009, which claims priority to Japanese Patent Application No. 2008-248335 filed Sep. 26, 2008, the entire contents of each of these applications being incorporated herein by reference in their entirety.

TECHNICAL FIELD

The invention relates to a non-contact charging system including a power transmission terminal for exciting a near-electromagnetic field and a power receiving terminal for performing non-contact charging by being coupled to the near-electromagnetic field.

BACKGROUND

In general, it is desirable that a charging current and a charging voltage for a rechargeable battery be controlled at the time of charging so as to obtain an appropriate charging pattern (charging profile) in accordance with the type of the rechargeable battery, for example, a lithium-ion battery, a nickel-cadmium battery, an electric double layer capacitor, or a nickel-hydrogen battery. Examples of appropriate charging patterns corresponding to battery types are illustrated in FIGS. 1A and 1B. For example, in the case of lithium-ion batteries, it is desirable to perform constant-current charging and then perform constant-voltage charging after a charging voltage has reached a predetermined value. For example, in the case of nickel-hydrogen rechargeable batteries, it is desirable to perform constant-current charging and to terminate the charging when voltage drop or temperature rise occurs.

In order to achieve such an appropriate charging pattern, a charging control circuit may be connected to a rechargeable battery. When a charging control circuit is connected to only a single type of rechargeable battery, an appropriate charging pattern can be easily achieved. In contrast, when a rechargeable battery is exchangeable, an unsupported type of rechargeable battery may be connected to a charging control circuit and the rechargeable battery may be charged in accordance with an inappropriate charging pattern. A charging control circuit capable of identifying the type of a rechargeable battery and charging only a supported type of rechargeable battery is sometimes used. See, for example, Japanese Unexamined Patent Application Publication No. 2001-266955 (Patent Document 1).

In order to connect a rechargeable battery disposed in a power receiving terminal such as an RFID, a wireless handset, or an electric shaver to mains, non-contact power transmission using a near-electromagnetic field, that is, non-contact charging requiring no power line between the power receiving terminal and mains, is sometimes performed. In this case, a charging control circuit is disposed in the power receiving terminal. The power receiving terminal sometimes transmits a signal to a power transmission terminal by performing load modulation communication so as to be authenticated. See, for example, Japanese Unexamined Patent Application Publication No. 2003-23366 (Patent Document 2).

SUMMARY to the present disclosure provides a non-contact charging system capable of charging a plurality of power receiving terminals requiring different charging patterns with a common power transmission terminal and reducing the sizes of the power receiving terminals and the amounts of heat produced by the power receiving terminals.

According to an aspect of the disclosure, a non-contact charging system includes a power transmission terminal and a power receiving terminal. The power transmission terminal includes a charging control unit, a power transmission unit, and a primary-side signal processing unit. The charging control unit outputs an alternating current signal having a voltage based on a charging control signal. The power transmission unit excites a near-electromagnetic field in accordance with the alternating current signal. The primary-side signal processing unit acquires a reception signal on the basis of a voltage at the power transmission unit when load modulation communication is performed, and sets the charging control signal on the basis of reference information included in the reception signal. The power receiving terminal includes a power receiving unit, a charging voltage generation unit, a load modulation unit, an information acquisition unit, and a secondary-side signal processing unit. The power receiving unit is couplable to the near-electromagnetic field. The charging voltage generation unit generates a charging voltage for a rechargeable battery from an output of the power receiving unit. The load modulation unit changes a load impedance of the power receiving unit as viewed from the power transmission unit by performing load modulation when the load modulation communication is performed. The information acquisition unit acquires the reference information related to the rechargeable battery. The secondary-side signal processing unit controls the load modulation unit using the reference information acquired by the information acquisition unit as a transmission signal when the load modulation communication is performed.

According to another aspect of the disclosure, in the non-contact charging system, the charging control unit in the power transmission terminal appropriately performs charging control on the basis of reference information acquired by the information acquisition unit in the power receiving terminal. As a result, the strength of a near-electromagnetic field can be adjusted and it is possible for the power receiving terminal to generate a charging voltage with which an appropriate charging pattern can be obtained. Since the charging control unit is disposed not in the power receiving terminal but in the power transmission terminal, the size of the power receiving terminal and the amount of heat produced by the power receiving terminal can be reduced. Since the power transmission terminal can perform charging control on the basis of reference information, it is possible to charge a plurality of power receiving terminals having different pieces of reference information with a common power transmission terminal.

According to a more detailed aspect of the disclosure, the secondary-side signal processing unit preferably uses the reference information and an identifier unique to the power receiving terminal as the transmission signal. In load modulation communication in the related art, the authentication of a terminal is generally performed using an identifier unique to the terminal as a transmission signal. Accordingly, by transmitting reference information of a rechargeable battery from the power receiving terminal to the power transmission terminal using this load modulation communication function, it is possible to transmit the reference information of the rechargeable battery with a simple configuration without adding a special configuration.

In another more detailed aspect of the disclosure, the reference information may include a voltage set value of the alternating current signal output by the charging control unit.

In yet another more detailed aspect of the disclosure, the reference information may include characteristic information of the rechargeable battery stored in advance in the information acquisition unit. As the characteristic information, for example, information about a battery type such as a lithium-ion battery, a nickel-cadmium battery, an electric double layer capacitor, or a nickel-hydrogen battery or information about an optimum charging pattern may be used.

In still another more detailed aspect of the disclosure, the reference information may include timely information acquired by the information acquisition unit while the rechargeable battery is charged. As the characteristic information, information about the temperature of the rechargeable battery, information about a charging current, or information about a charging voltage may be used.

In another more detailed aspect of the disclosure, the reference information may include a processing program for the primary-side signal processing unit, the processing program controls the charging control unit on the basis of a type of the rechargeable battery. Even if a new type of a rechargeable battery or a power receiving terminal compliant with a new standard appears, it is possible to charge a terminal in accordance with an appropriate charging pattern with an updateable processing program.

DETAILED DESCRIPTION

For users of a non-contact charging system, it is more convenient to charge a plurality of power receiving terminals with a common power transmission terminal than it is to have a plurality of power transmission terminals for these power receiving terminals. However, the inventor realized that since each power receiving terminal must be charged in accordance with an appropriate charging pattern, it is difficult to obtain a common power transmission terminal for various power receiving terminals including various types of batteries with the related art.

When charging control circuits are individually disposed in all power receiving terminals so as to achieve appropriate charging patterns for rechargeable batteries in the power receiving terminals, it is possible to charge the power receiving terminals with a common power transmission terminal. However, it is necessary to dispose a large-sized and heat-producing component such as a DC/DC converter in a charging control circuit. This leads to the increase in the size of a power receiving terminal. In addition, since the amount of heat produced is increased, the characteristic of a rechargeable battery is therefore deteriorated.

A method of disposing a charging control circuit not in a power receiving terminal but in a power transmission terminal can be considered. In this case, in order to achieve appropriate charging patterns for power receiving terminals, it would be necessary to prepare a dedicated power transmission terminal for each of the charging patterns. A power receiving terminal requiring an unsupported charging pattern may also be attached to a power transmission terminal. This method is therefore impracticable.

An exemplary embodiment of the disclosure will now be described using an example of a non-contact charging system that is a non-contact charging circuit or a non-contact charging adapter for a mobile telephone or a mobile PC.

Figure 2:
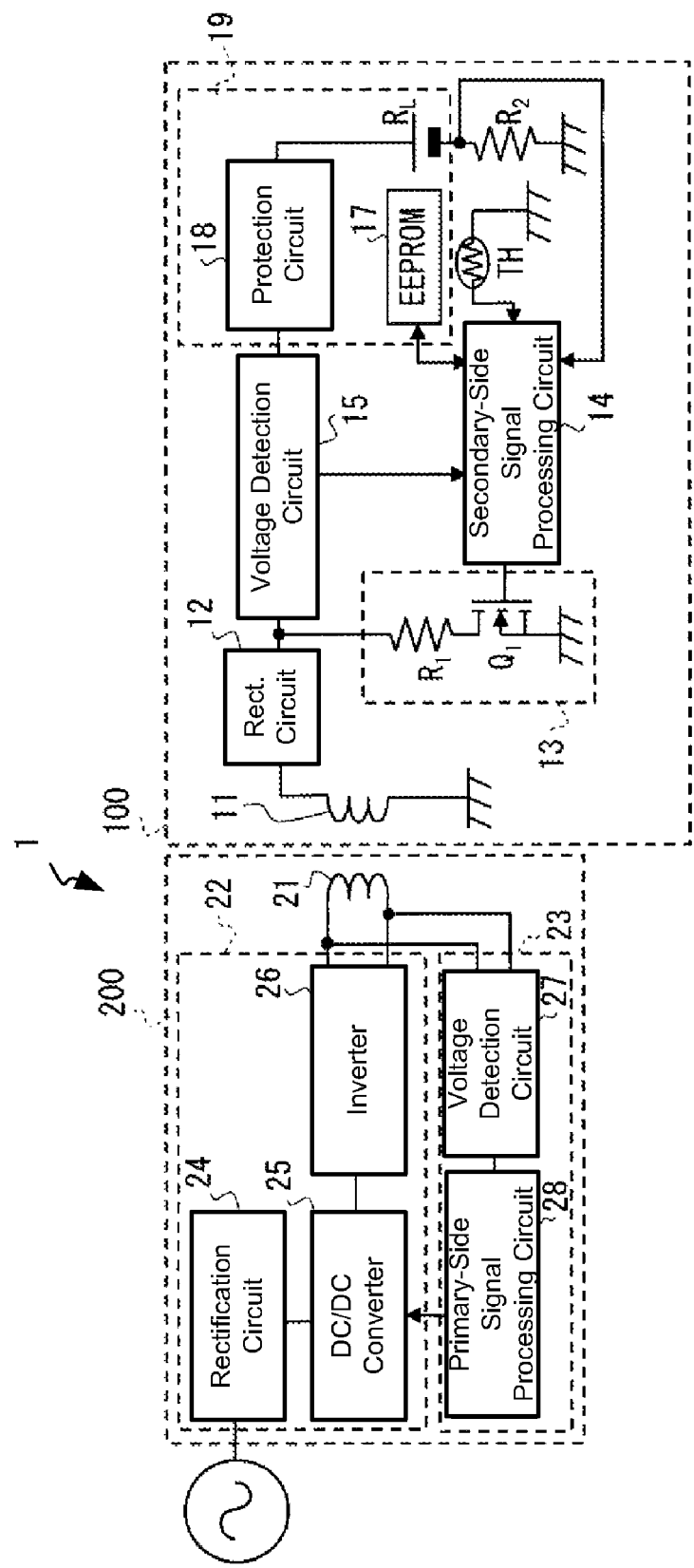
FIG. 2 is a schematic circuit diagram of a non-contact charging system according to a first exemplary embodiment.

FIG. 2 is a diagram illustrating an exemplary circuit in a non-contact charging system 1 according to the first embodiment of the present invention. The non-contact charging system 1 includes a power receiving terminal 100 and a power transmission terminal 200.

The power transmission terminal 200 includes a coil antenna 21, a charging control unit 22, and a primary-side signal processing unit 23. The charging control unit 22 includes a rectification circuit 24, a DC/DC converter 25, and an inverter 26. The rectification circuit 24 rectifies an alternating voltage received from a commercial power source or the like. The DC/DC converter 25 transforms an output voltage of the rectification circuit 24 to a charging control voltage, which is a direct voltage, in accordance with a charging control signal output from the primary-side signal processing unit 23 and outputs the charging control voltage. The inverter 26 converts the charging control voltage output from the DC/DC converter 25 into an alternating voltage and supplies it to the coil antenna 21. The coil antenna 21 is a transmission unit according to the present embodiment, and a near-electromagnetic field is excited at the coil antenna 21 when power is supplied from the inverter 26 to the coil antenna 21. The primary-side signal processing unit 23 includes a voltage detection circuit 27 and a primary-side signal processing circuit 28. The voltage detection circuit 27 performs envelope detection and waveform shaping upon an alternating voltage across the coil antenna 21 and outputs an envelope voltage signal. The primary-side signal processing circuit 28 samples the envelope voltage signal output from the voltage detection circuit 27, detects a signal transmitted from the power receiving terminal 100 on the basis of a signal level variation, and sets a charging control signal on the basis of reference information included in the received signal.

The power receiving terminal 100 includes a coil antenna 11, a rectification circuit (Rect. Circuit) 12, a load modulation unit 13, a secondary-side signal processing circuit 14, a voltage detection circuit 15, a current detection resistor $R_2$, a thermistor TH, and a rechargeable battery pack 19. The coil antenna 11 is a power receiving unit according to the present embodiment, and is coupled to the near-electromagnetic field at the coil antenna 21 when the power receiving terminal 100 is disposed at a position where the power transmission terminal 200 can perform charging. The rectification circuit 12 is a charging voltage generation unit according to the present embodiment, and rectifies a high-frequency signal output from the coil antenna 11. The load modulation unit 13 includes a resistor $R_1$ and a switch $Q_1$. A first terminal of the resistor $R_1$ is connected between the rectification circuit 12 and the rechargeable battery pack 19. The switch $Q_1$ is connected between a second terminal of the resistor $R_1$ and ground.

The secondary-side signal processing circuit 14 acquires the reference information, generates a transmission signal, and controls the ON/OFF state of the switch $Q_1$ in accordance with the transmission signal. When the ON/OFF state of the switch $Q_1$ is controlled, the impedance of the load modulation unit 13 is changed and the load impedance of the coil antenna 11 in the power receiving terminal 100 as viewed from the coil antenna 21 in the power transmission terminal 200 is changed. Accordingly, the power transmission terminal 200 can detect a load modulation communication signal.

The voltage detection circuit 15 is disposed on a power line between the rectification circuit 12 and the rechargeable battery pack 19, and detects a voltage (a charging voltage) at the power line. The current detection resistor $R_2$ is disposed on a power charging line between the rechargeable battery pack 19 and the ground. The thermistor TH is disposed near the rechargeable battery pack 19, and senses an ambient temperature around the rechargeable battery pack 19. The voltage detection circuit 15, the current detection resistor $R_2$, and the thermistor TH form an information acquisition unit according to the present embodiment along with the secondary-side signal processing circuit 14. A voltage, a current, and a temperature detected by the secondary-side signal processing circuit 14 on the basis of outputs of the voltage detection circuit 15, the current detection resistor $R_2$, and the thermistor TH correspond to timely information according to the present embodiment.

The rechargeable battery pack 19 includes a protection circuit 18, an EEPROM (Electrically Erasable Programmable Read-Only Memory) 17, and a rechargeable battery $R_L$. The protection circuit 18 is disposed between the rectification circuit 12 and the rechargeable battery $R_L$, and interrupts a charging current when the rechargeable battery $R_L$ is brought into an abnormally high temperature state or an overcurrent is generated. The rechargeable battery $R_L$ is a power source used for the operation of, for example, a mobile telephone. The EEPROM 17 stores a battery type of the rechargeable battery $R_L$, an optimum charging pattern for the rechargeable battery $R_L$, etc. The EEPROM 17 forms the information acquisition unit according to the present embodiment along with the secondary-side signal processing circuit 14. Information about the characteristic of a rechargeable battery stored in the EEPROM 17 corresponds to characteristic information according to the present embodiment.

Since an optimum charging pattern for a rechargeable battery depends on the number of charges and a charging time, the EEPROM 17 can also store a charging history and the secondary-side signal processing circuit 14 can compute an optimum charging pattern on the basis of the charging history.

The non-contact charging system 1 having the above-described configuration operates while switching between a load modulation communication mode and a power transmission mode. The power transmission terminal 200 outputs a high charging control voltage in the power transmission mode. After a predetermined period has elapsed, the power transmission terminal 200 switches from the power transmission mode to the load modulation communication mode, outputs a low charging control voltage, and suppresses a near-electromagnetic field at the coil antenna 21. On the other hand, in the power receiving terminal 100, the secondary-side signal processing circuit 14 determines whether the value of a charging voltage is a voltage value in the load modulation communication mode or a voltage value in the power transmission mode and switches between operations in accordance with a result of the determination.

Figure 3A:
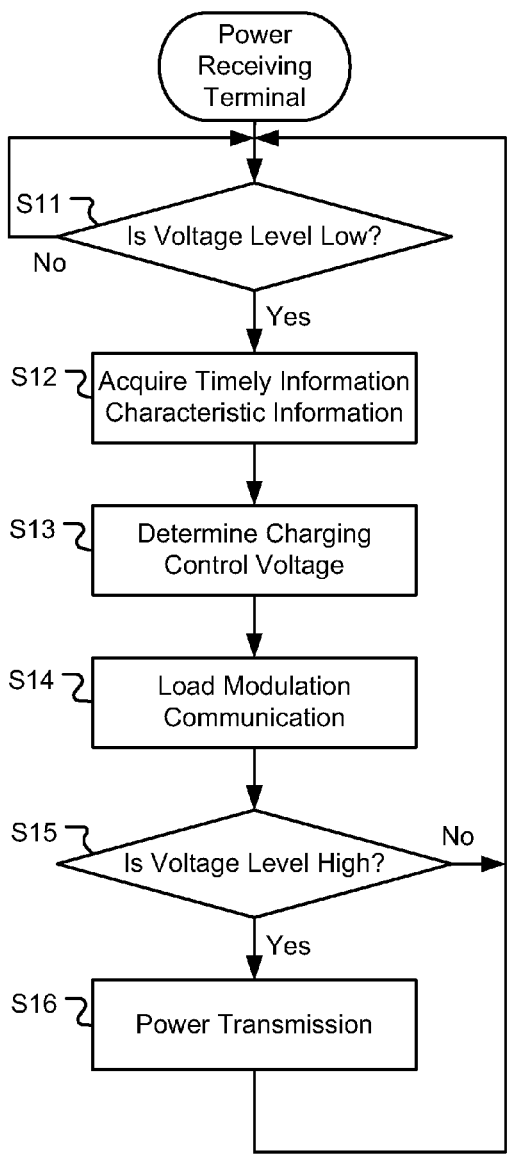
FIG. 3 is a flowchart describing a process performed by a non-contact charging system according to the first exemplary embodiment.
Figure 3B:
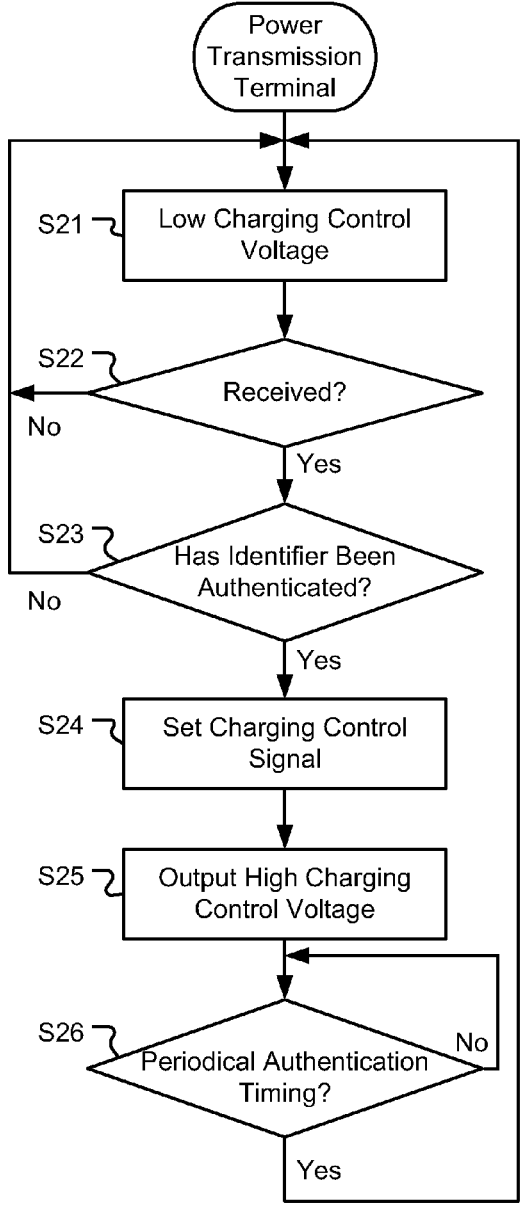

FIGS. 3A and 3B are flowcharts illustrating a process performed by the non-contact charging system 1. FIG. 3A is a flowchart illustrating a process performed by the power receiving terminal 100. FIG. 3B is a flowchart illustrating a process performed by the power transmission terminal 200.

With reference to FIGS. 2 and 3A, in the power receiving terminal 100, the secondary-side signal processing circuit 14 performs mode determination on the basis of a charging voltage output from the voltage detection circuit 15. When the voltage level of the charging voltage is lower than a predetermined value, the secondary-side signal processing circuit 14 determines that the load modulation communication mode is set and performs operation control for the load modulation communication mode (i.e., the "Yes" path from S11).

In the load modulation mode, first, the secondary-side signal processing circuit 14 acquires timely information, which changes with time, from outputs of the voltage detection circuit 15, the current detection resistor $R_2$, and the thermistor TH. Furthermore, the secondary-side signal processing circuit 14 acquires characteristic information from the EEPROM 17 (S12). At that time, the secondary-side signal processing circuit 14 can read out a past charging history from the EEPROM 17, and can additionally store a detected voltage, a detected current, a detected temperature, and a charging time in the EEPROM 17 as a charging history.

Subsequently, the secondary-side signal processing circuit 14 determines a charging control voltage that should be set in the primary-side signal processing circuit 28 in the power transmission terminal 200 by computation on the basis of the characteristic information and the timely information (S13).

Subsequently, the secondary-side signal processing circuit 14 controls the ON/OFF state of the switch $Q_1$, and performs load modulation communication using a terminal identifier unique to a terminal, such as a mobile telephone, and the charging control voltage as a transmission signal (S14). When the ON/OFF state of the switch $Q_1$ is controlled, the load impedance of the coil antenna 11 in the power receiving terminal 100 as viewed from the coil antenna 21 in the power transmission terminal 200 is changed and the level of a voltage at the coil antenna 21 in the power transmission terminal 200 is changed in accordance with the transmission signal from the power receiving terminal 100.

The secondary-side signal processing circuit 14 monitors a charging voltage output from the voltage detection circuit 15 for a predetermined period. When the voltage level of the charging voltage exceeds the predetermined value, the secondary-side signal processing circuit 14 determines that the power transmission mode is set and performs operation control for the power transmission mode. When the voltage level of the charging voltage does not exceed the predetermined value, the secondary-side signal processing circuit 14 performs the operation control for the load modulation communication mode again (i.e., the "No" path is taken from decision S15). In the power transmission mode, a charging voltage much higher than an electromotive voltage of the rechargeable battery $R_L$ is supplied to the rechargeable battery $R_L$ and charging of the rechargeable battery $R_L$ proceeds (S16).

On the other hand, the power transmission terminal 200 performs an operation for the load modulation communication mode in a standby state, and performs an operation for the power transmission mode upon receiving a load modulation communication signal. After a predetermined period has elapsed in the power transmission mode, the power transmission mode is switched to the load modulation communication mode and the periodical authentication of the power receiving terminal 100 is performed.

With reference now to FIGS. 2 and 3B, in the load modulation communication mode, first, the primary-side signal processing circuit 28 outputs a charging control signal used to set a low charging control voltage and controls the DC/DC converter 25 (S21). As a result, the voltage level of the charging voltage for the power receiving terminal 100 is reduced. Accordingly, in the power receiving terminal 100, an operation for transmitting a load modulation communication signal is performed.

Subsequently, the primary-side signal processing circuit 28 in the power transmission terminal 200 detects a transmission signal output from the power receiving terminal 100 (S22). The primary-side signal processing circuit 28, which has detected the transmission signal, authenticates a terminal identifier (S23). When the terminal identifier can be authenticated, the "Yes" path is taken from S23 and the primary-side signal processing circuit 28 outputs a charging control signal used to set a charging control voltage (a high charging control voltage) included in the transmission signal and controls the DC/DC converter 25 (S24).

As a result, a voltage output from the DC/DC converter 25 is changed to the high charging control voltage and a near-electromagnetic field excited at the coil antenna 21 becomes stronger (S25). Accordingly, in the power receiving terminal 100, the charging voltage exceeds the predetermined value, the power transmission mode is set, and the charging of the rechargeable battery $R_L$ proceeds.

Subsequently, at a periodical authentication timing after a predetermined period has elapsed, the primary-side signal processing circuit 28 in the power transmission terminal 200 performs the operation for the load modulation communication mode again (S26).

In the above-described process, the secondary-side signal processing circuit 14 in the power receiving terminal 100 appropriately sets the voltage value of a high charging control voltage for the power transmission terminal 200. As a result, it is possible to set a charging voltage and a charging current for the power receiving terminal 100 with which an optimum charging pattern for the rechargeable battery $R_L$ can be achieved.

Figure 1B:
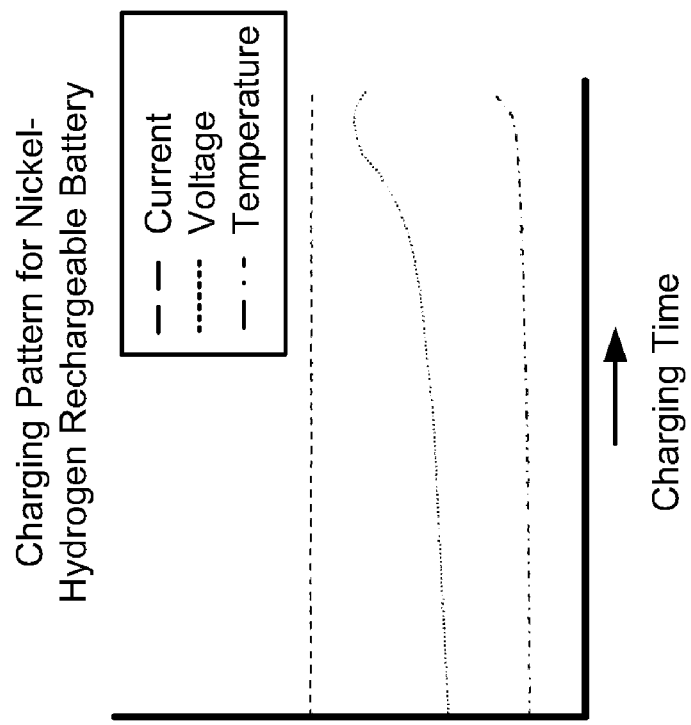
FIGS. 1A and 1B are diagrams describing examples of optimum charging patterns for general rechargeable batteries.
Figure 1A:
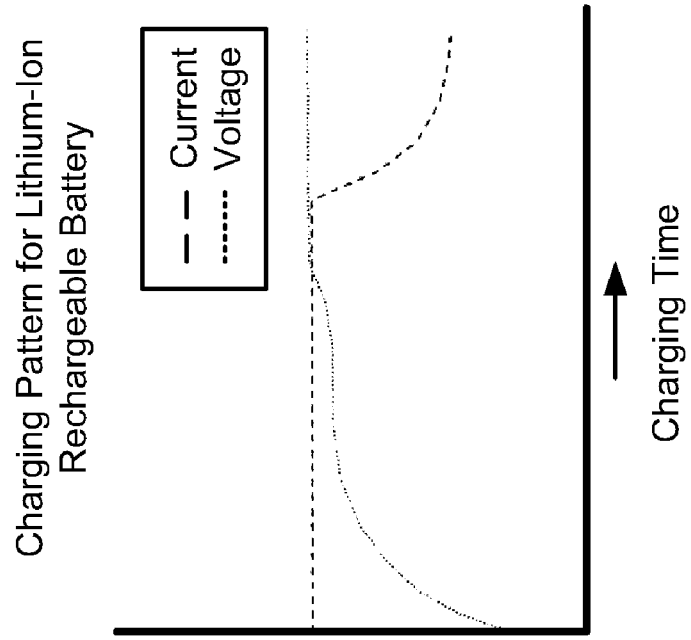

For example, when the battery type of the rechargeable battery $R_L$ is a lithium-ion battery, a high charging control voltage is set so that a charging pattern similar to the charging pattern illustrated in FIG. 1A can be obtained. That is, the secondary-side signal processing circuit 14 performs charging current feedback control computation so as to make a charging current on the secondary side constant, and monitors a charging voltage while the computation is performed. When the increase in the monitored charging voltage is stopped, the secondary-side signal processing circuit 14 performs charging voltage feedback control so as to make the charging voltage constant and achieves a charging pattern in which the charging current decreases at the constant charging voltage.

For example, when the battery type of the rechargeable battery $R_L$ is a nickel-hydrogen battery, a high charging control voltage is set so that a charging pattern similar to the charging pattern illustrated in FIG. 1B can be obtained. That is, the secondary-side signal processing circuit 14 performs charging current feedback control computation so as to make a charging current on the secondary side constant, and monitors the temperature of the rechargeable battery $R_L$ and a charging voltage while the computation is performed. The secondary-side signal processing circuit 14 achieves a charging pattern in which, when the temperature of the rechargeable battery $R_L$ is rapidly increased or the charging voltage is reduced, charging is terminated.

As described previously, in the non-contact charging system 1 according to this embodiment, by causing the power receiving terminal 100 to acquire reference information and appropriately set a high charging control voltage for the power transmission terminal 200, the rechargeable battery $R_L$ can be charged in accordance with an optimum charging pattern. Accordingly, it is possible to charge various power receiving terminals including different types of batteries with a single power transmission terminal, that is, the power transmission terminal 200. By disposing the DC/DC converter 25 in the power transmission terminal 200, the power receiving terminal 100 does not need to have a DC/DC converter. Accordingly, the reduction in the size of the power receiving terminal 100 and the reduction in the amount of heat generated by the power receiving terminal 100 can be easily achieved.

Next, a non-contact charging system according to the second exemplary embodiment will be described. The same reference numerals are used to identify parts already described in the first exemplary embodiment, and the description thereof will be therefore omitted.

The configuration of a non-contact charging system according to this embodiment is substantially the same as that of a non-contact charging system according to the first exemplary embodiment, but a process performed by a non-contact charging system according to this embodiment differs from that performed by a non-contact charging system according to the first embodiment.

More specifically, as a transmission signal in load modulation communication, instead of a charging control voltage, a detected charging voltage, a detected charging current, and a detected temperature of a rechargeable battery are transmitted. The set value of a charging control voltage is computed not by the power receiving terminal 100, but by the power transmission terminal 200.

Accordingly, control performed by the secondary-side signal processing circuit 14 in the power receiving terminal 100 can be simplified, and the cost of the power receiving terminal 100 can be reduced.

Figure 4A:
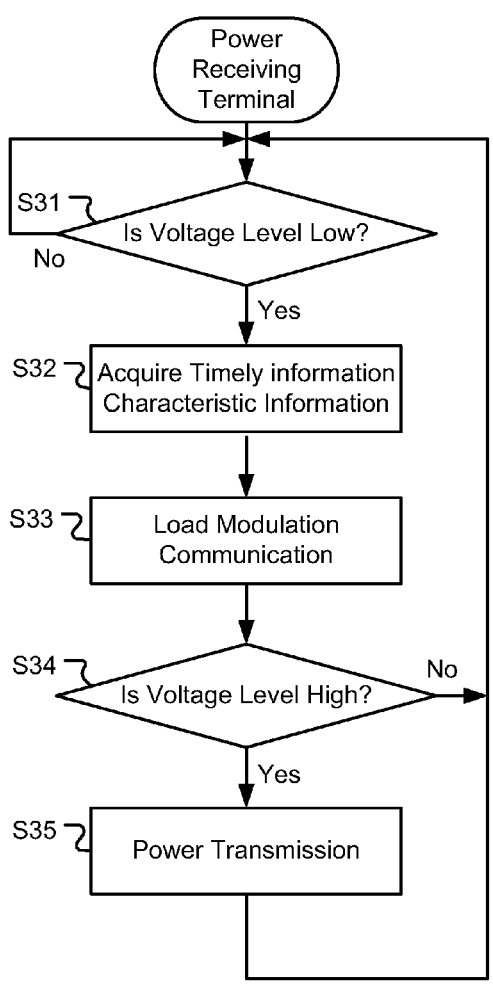
FIG. 4 is a flowchart describing a process performed by a non-contact charging system according to a second exemplary embodiment.
Figure 4B:
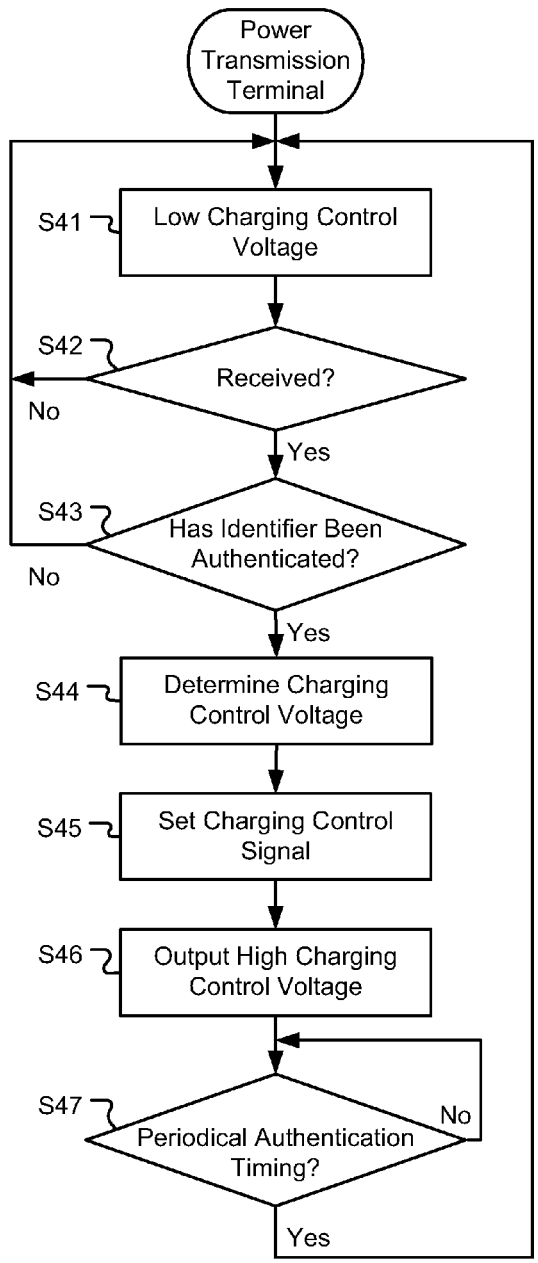

FIGS. 4A and 4B are flowcharts illustrating a process performed by a non-contact charging system according to the second exemplary embodiment. FIG. 4A is a flowchart illustrating a process performed by the power receiving terminal 100. FIG. 4B is a flowchart illustrating a process performed by the power transmission terminal 200.

With reference to FIGS. 2 and 4A, in the power receiving terminal 100, the secondary-side signal processing circuit 14 performs mode determination on the basis of a charging voltage output from the voltage detection circuit 15. When the voltage level of the charging voltage is lower than a predetermined value, the secondary-side signal processing circuit 14 determines that the load modulation communication mode is set and performs operation control for the load modulation communication mode (S31).

In the load modulation mode, first, the secondary-side signal processing circuit 14 acquires timely information, which changes with time, from outputs of the voltage detection circuit 15, the current detection resistor $R_2$, and the thermistor TH. Furthermore, the secondary-side signal processing circuit 14 acquires characteristic information from the EEPROM 17 (S32). At that time, the secondary-side signal processing circuit 14 can read out a past charging history from the EEPROM 17, and can additionally store a detected voltage, a detected current, a detected temperature, and a charging time in the EEPROM 17 as a charging history.

Subsequently, the secondary-side signal processing circuit 14 controls the ON/OFF state of the switch $Q_1$, and performs load modulation communication using a terminal identifier unique to a terminal such as a mobile telephone, the timely information, and the characteristic information as a transmission signal (S33). When the ON/OFF state of the switch $Q_1$ is controlled, the load impedance of the coil antenna 11 in the power receiving terminal 100 as viewed from the coil antenna 21 in the power transmission terminal 200 is changed and the level of a voltage at the coil antenna 21 in the power transmission terminal 200 is changed in accordance with the transmission signal.

The secondary-side signal processing circuit 14 monitors a charging voltage output from the voltage detection circuit 15 for a predetermined period. When the voltage level of the charging voltage exceeds the predetermined value, the secondary-side signal processing circuit 14 determines that the power transmission mode is set and performs operation control for the power transmission mode. When the voltage level of the charging voltage does not exceed the predetermined value, the secondary-side signal processing circuit 14 performs the operation control for the load modulation communication mode again (i.e., the "No" path is taken from decision S34). In the power transmission mode, a charging voltage much higher than an electromotive voltage of the rechargeable battery $R_L$ is supplied to the rechargeable battery $R_L$ and charging of the rechargeable battery $R_L$ proceeds (S35).

On the other hand, the power transmission terminal 200 performs an operation for the load modulation communication mode in a standby state, and performs an operation for the power transmission mode upon receiving a load modulation communication signal. After a predetermined period has elapsed in the power transmission mode, the power transmission mode is switched to the load modulation communication mode and the periodical authentication of the power receiving terminal 100 is performed.

With reference to FIGS. 2 and 4B, in the load modulation communication mode, first, the primary-side signal processing circuit 28 outputs a charging control signal used to set a low charging control voltage and controls the DC/DC converter 25 (S41). As a result, the voltage level of the charging voltage for the power receiving terminal 100 is reduced. Accordingly, in the power receiving terminal 100, an operation for transmitting a load modulation communication signal is performed.

Subsequently, the primary-side signal processing circuit 28 in the power transmission terminal 200 detects a transmission signal output from the power receiving terminal 100 (S42). The primary-side signal processing circuit 28, which has detected the transmission signal, authenticates a terminal identifier (S43). When the terminal identifier can be authenticated, the primary-side signal processing circuit 28 determines a charging control voltage by computation on the basis of the characteristic information and the timely information included in the transmission signal (S44).

Subsequently, the primary-side signal processing circuit 28 outputs a charging control signal used to set the determined charging control voltage and controls the DC/DC converter 25 (S45).

As a result, a voltage output from the DC/DC converter 25 is changed to a high charging control voltage and a near-electromagnetic field excited at the coil antenna 21 becomes stronger (S46). Accordingly, in the power receiving terminal 100, the charging voltage exceeds the predetermined value, the power transmission mode is set, and the charging of the rechargeable battery $R_L$ proceeds.

Subsequently, at a periodical authentication timing after a predetermined period has elapsed, the primary-side signal processing circuit 28 in the power transmission terminal 200 performs the operation for the load modulation communication mode again (i.e., the "Yes" path is taken from decision S47).

In the above-described process, the primary-side signal processing circuit 28 in the power transmission terminal 200 appropriately sets the voltage value of a high charging control voltage. As a result, it is possible to set a charging voltage and a charging current for the power receiving terminal 100 with which an optimum charging pattern for the rechargeable battery $R_L$ can be achieved.

Next, a non-contact charging system according to a third exemplary embodiment will be described. The same reference numerals are used to identify parts already described in the first exemplary embodiment, and the description thereof will be therefore omitted.

The configuration of a non-contact charging system according to this embodiment is substantially the same as that of a non-contact charging system according to the first exemplary embodiment, but a process performed by a non-contact charging system according to this embodiment differs from that performed by a non-contact charging system according to the first embodiment.

More specifically, a microcontroller for achieving a platform-independent program execution environment with a virtual machine is employed as the primary-side signal processing circuit 28. A byte code (or one of a machine language and an interpreter language) for the virtual machine that is a processing program for computing a set value of a charging control voltage is transmitted by load modulation communication so as to be updated.

Figure 5:
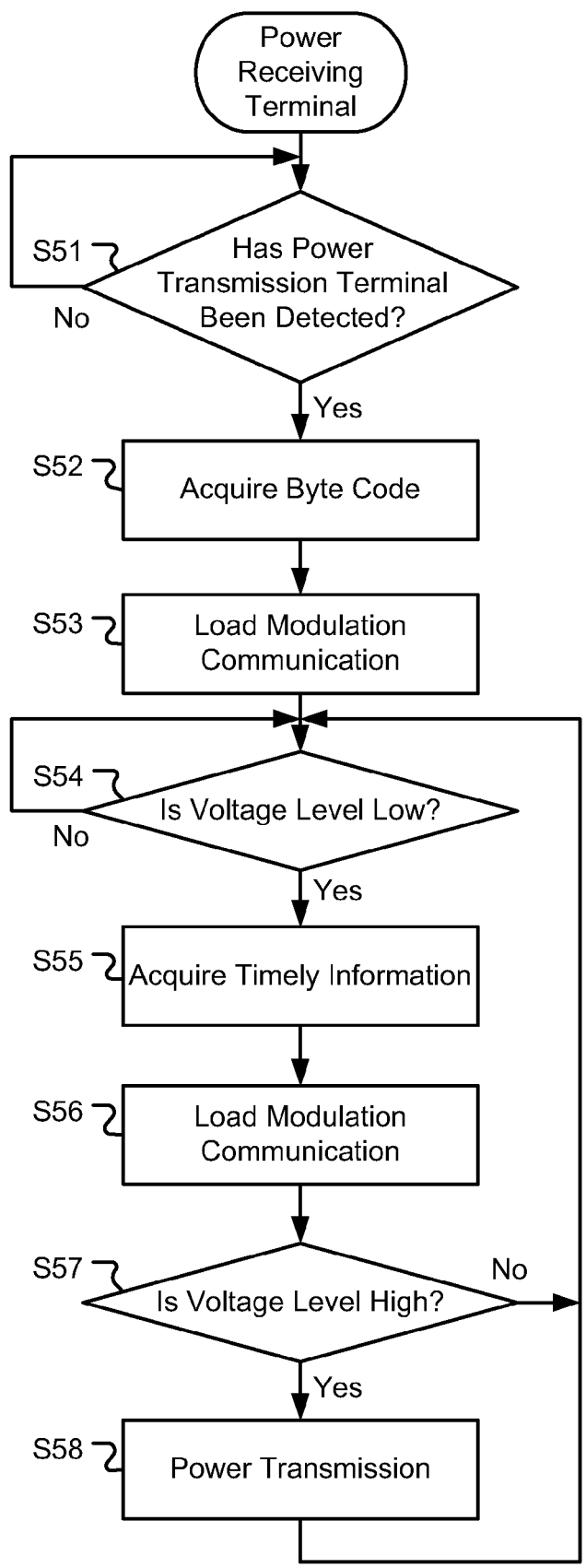
FIG. 5 is a flowchart describing a process performed by a power receiving terminal in a non-contact charging system according to a third exemplary embodiment.

FIG. 5 is a flowchart illustrating a process performed by a power receiving terminal in a non-contact charging system according to the third exemplary embodiment.

The power receiving terminal 100 updates a processing program when starting communication with the power transmission terminal 200.

With reference now to FIGS. 2 and 5, first, the secondary-side signal processing circuit 14 detects the connection to the power transmission terminal 200 on the basis of an output of the charging voltage detection circuit 15 (S51). After the detection, the "Yes" path is taken from decision S51 and the secondary-side signal processing circuit 14 acquires a byte code from the EEPROM 17 (S52). This byte code corresponds to the battery type of the rechargeable battery $R_L$.

Subsequently, the secondary-side signal processing circuit 14 controls the ON/OFF state of the switch $Q_1$, and performs load modulation communication using a terminal identifier unique to a terminal, such as a mobile telephone, and the byte code as a transmission signal (S53). As a result, the load impedance of the coil antenna 11 in the power receiving terminal 100 as viewed from the coil antenna 21 in the power transmission terminal 200 is changed, and the voltage level at the coil antenna 21 in the power transmission terminal 200 is changed in accordance with the transmission signal from the power receiving terminal 100.

Subsequently, the secondary-side signal processing circuit 14 performs mode determination on the basis of a charging voltage output from the voltage detection circuit 15. When the voltage level of the charging voltage is lower than a predetermined value, the secondary-side signal processing circuit 14 determines that the load modulation communication mode is set and performs operation control for the load modulation communication mode (i.e., the "Yes" path is taken from decision S54).

In the load modulation communication mode, first, the secondary-side signal processing circuit 14 acquires timely information, which changes with time, from outputs of the voltage detection circuit 15, the current detection resistor $R_2$, and the thermistor TH (S55). At that time, the secondary-side signal processing circuit 14 can read out a past charging history from the EEPROM 17, and can additionally store a detected voltage, a detected current, a detected temperature, and a charging time in the EEPROM 17 as a charging history.

Subsequently, the secondary-side signal processing circuit 14 controls the ON/OFF state of the switch $Q_1$, and performs load modulation communication using a terminal identifier unique to a terminal, such as a mobile telephone, and the timely information as a transmission signal (S56). When the ON/OFF state of the switch $Q_1$ is controlled, the load impedance of the coil antenna 11 in the power receiving terminal 100 as viewed from the coil antenna 21 in the power transmission terminal 200 is changed and the voltage level at the coil antenna 21 in the power transmission terminal 200 is changed in accordance with the transmission signal from the power receiving terminal 100.

The secondary-side signal processing circuit 14 monitors a charging voltage output from the voltage detection circuit 15 for a predetermined period. When the voltage level of the charging voltage exceeds a predetermined value, the secondary-side signal processing circuit 14 determines that the power transmission mode is set and performs operation control for the power transmission mode. When the voltage level of the charging voltage does not exceed the predetermined value, the secondary-side signal processing circuit 14 performs the operation control for the load modulation communication mode again (i.e., the "No" path is taken from decision S57). In the power transmission mode, a charging voltage much higher than an electromotive voltage of the rechargeable battery $R_L$ is supplied to the rechargeable battery $R_L$ and charging of the rechargeable battery $R_L$ proceeds (S58).

Figure 6:
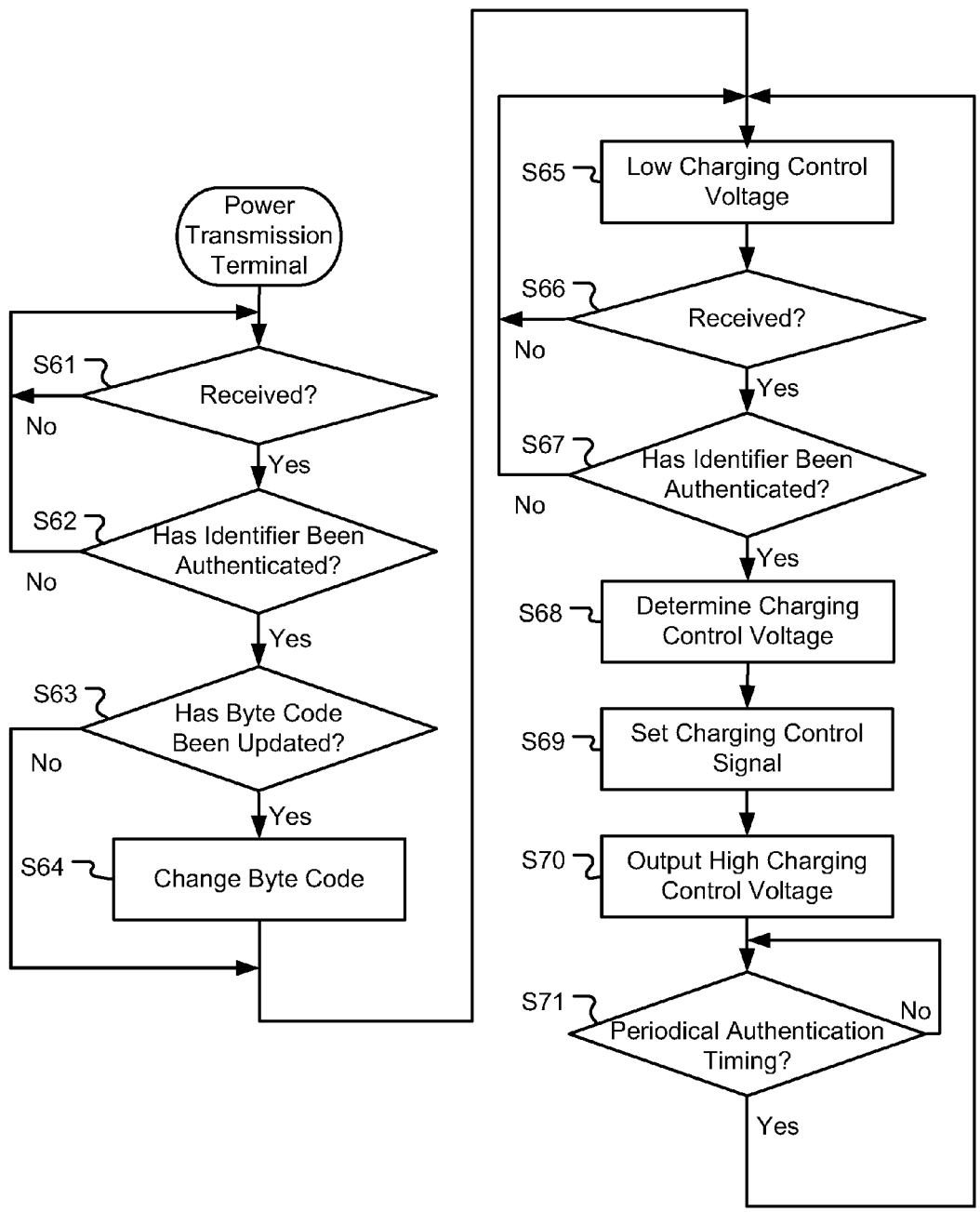
FIG. 6 is a flowchart describing a process performed by a power transmission terminal in a non-contact charging system according to the third exemplary embodiment.

FIG. 6 is a flowchart illustrating an exemplary process performed by a power transmission terminal in a non-contact charging system according to the third embodiment.

With reference now to FIGS. 2 and 6, in the power transmission terminal 200, the primary-side signal processing circuit 28 detects a transmission signal from the power receiving terminal 100 when starting communication with the power receiving terminal 100 (S61). After the detection, the "Yes" path is taken from decision S61 and the primary-side signal processing circuit 28 authenticates a terminal identifier (S62). When the terminal identifier can be authenticated, the "Yes" path is taken from decision S62 and the primary-side signal processing circuit 28 determines whether a byte code included in the transmission signal is the latest one that has been updated (S63). When the terminal identifier has already been updated, the "Yes" path is taken from decision S63 and a processing program for the primary-side signal processing circuit 28 is changed (S64).

Subsequently, the primary-side signal processing circuit 28 performs an operation for the load modulation communication mode, outputs a charging control signal used to set a low charging control voltage, and controls the DC/DC converter 25 (S65). As a result, the voltage level of a charging voltage for the power receiving terminal 100 is reduced. Accordingly, in the power receiving terminal 100, an operation for transmitting a load modulation communication signal is performed.

Subsequently, the primary-side signal processing circuit 28 in the power transmission terminal 200 detects a transmission signal from the power receiving terminal 100 (i.e., the "Yes" path from decision S66). The primary-side signal processing circuit 28, which has detected the transmission signal, authenticates a terminal identifier (S67). When the terminal identifier can be authenticated, the "Yes" path is taken from decision S67 and the primary-side signal processing circuit 28 determines a charging control voltage by computation on the basis of timely information included in the transmission signal (S68).

Subsequently, the primary-side signal processing circuit 28 outputs a charging control signal used to set the determined charging control voltage and controls the DC/DC converter 25 (S69).

As a result, the output voltage of the DC/DC converter 25 is changed to a high charging control voltage, and a near-electromagnetic field excited at the coil antenna 21 becomes stronger (S70). Accordingly, a charging voltage in the power receiving terminal 100 exceeds the predetermined value, the power transmission mode is set, and charging of the rechargeable battery $R_L$ proceeds.

Subsequently, at a periodical authentication timing after a predetermined period has elapsed, the primary-side signal processing circuit 28 in the power transmission terminal 200 performs the operation for the load modulation communication mode again (i.e., the "Yes" path is taken from decision S71).

In the above-described process, the primary-side signal processing circuit 28 in the power transmission terminal 200 appropriately sets the voltage value of a high charging control voltage. As a result, it is possible to set a charging voltage and a charging current for the power receiving terminal 100 with which an optimum charging pattern for the rechargeable battery $R_L$ can be achieved.

According to embodiments consistent with the disclosure, since a power transmission terminal performs charging control on the basis of reference information acquired by an information acquisition unit in a power receiving terminal, it is possible to charge a plurality of power receiving terminals having different charging patterns with a common power transmission terminal. Furthermore, the size of a power receiving terminal and the amount of heat produced by a power receiving terminal can be reduced.

It should be understood that the above-described embodiments are illustrative only and that variations and modifications will be apparent to those skilled in the art without departing from the scope and spirit of the disclosure. The scope of the present invention should be determined in view of the appended claims and their equivalents.

The invention claimed is:

1. A non-contact charging system comprising:
    a power transmission terminal; and
    a power receiving terminal,
    the power transmission terminal including a charging control unit configured to output an alternating current signal having a voltage based on a charging control signal, a power transmission unit configured to excite a near-electromagnetic field in accordance with the alternating current signal, and a primary-side signal processing unit configured to, when load modulation communication is performed, acquire a reception signal on the basis of a voltage at the power transmission unit and set the charging control signal on the basis of reference information included in the reception signal,
    the power receiving terminal including a power receiving unit couplable to the near-electromagnetic field, a charging voltage generation unit configured to rectify an alternating current signal outputted by the power receiving unit, a load modulation communication unit configured to, when the load modulation communication is performed, change a load impedance of the power receiving unit as viewed from the power transmission unit by performing load modulation, an information acquisition unit configured to acquire the reference information including a predetermined optimum charging pattern related to the rechargeable battery, and a secondary-side signal processing unit configured to, when the load modulation communication is performed, control the load modulation unit using the reference information acquired by the information acquisition unit as a transmission signal, wherein the charging voltage generating unit controls a voltage value of the alternating current signal such that a charging voltage for the rechargeable battery is substantially equal to the predetermined optimum charging pattern for the rechargeable battery on the basis of the reference information included in the reception signal, and a charging control function is performed at a power transmission terminal side.

2. The non-contact charging system according to claim 1, wherein the secondary-side signal processing unit uses the reference information and an identifier unique to the power receiving terminal as the transmission signal.

3. The non-contact charging system according to claim 1, wherein the reference information includes a voltage set value of the alternating current signal output by the charging control unit.

4. The non-contact charging system according to claim 2, wherein the reference information includes a voltage set value of the alternating current signal output by the charging control unit.

5. The non-contact charging system according to claim 1, wherein the reference information includes timely information acquired by the information acquisition unit while the rechargeable battery is charged.

6. The non-contact charging system according to claim 2, wherein the reference information includes timely information acquired by the information acquisition unit while the rechargeable battery is charged.

7. The non-contact charging system according to claim 3, wherein the reference information includes timely information acquired by the information acquisition unit while the rechargeable battery is charged.

8. The non-contact charging system according to claim 4, wherein the reference information includes timely information acquired by the information acquisition unit while the rechargeable battery is charged.

9. The non-contact charging system according to claim 1, wherein the reference information includes characteristic information of the rechargeable battery stored in advance in the information acquisition unit.

10. The non-contact charging system according to claim 2, wherein the reference information includes characteristic information of the rechargeable battery stored in advance in the information acquisition unit.

11. The non-contact charging system according to claim 3, wherein the reference information includes characteristic information of the rechargeable battery stored in advance in the information acquisition unit.

12. The non-contact charging system according to claim 4, wherein the reference information includes characteristic information of the rechargeable battery stored in advance in the information acquisition unit.

13. The non-contact charging system according to claim 5, wherein the reference information includes characteristic information of the rechargeable battery stored in advance in the information acquisition unit.

14. The non-contact charging system according to claim 6, wherein the reference information includes characteristic information of the rechargeable battery stored in advance in the information acquisition unit.

15. The non-contact charging system according to claim 7, wherein the reference information includes characteristic information of the rechargeable battery stored in advance in the information acquisition unit.

16. The non-contact charging system according to claim 8, wherein the reference information includes characteristic information of the rechargeable battery stored in advance in the information acquisition unit.

17. The non-contact charging system according to claim 1, wherein the reference information includes a processing program for the primary-side signal processing unit, the processing program controlling the charging control unit on the basis of a type of the rechargeable battery.

* * * * *